Figure 1:
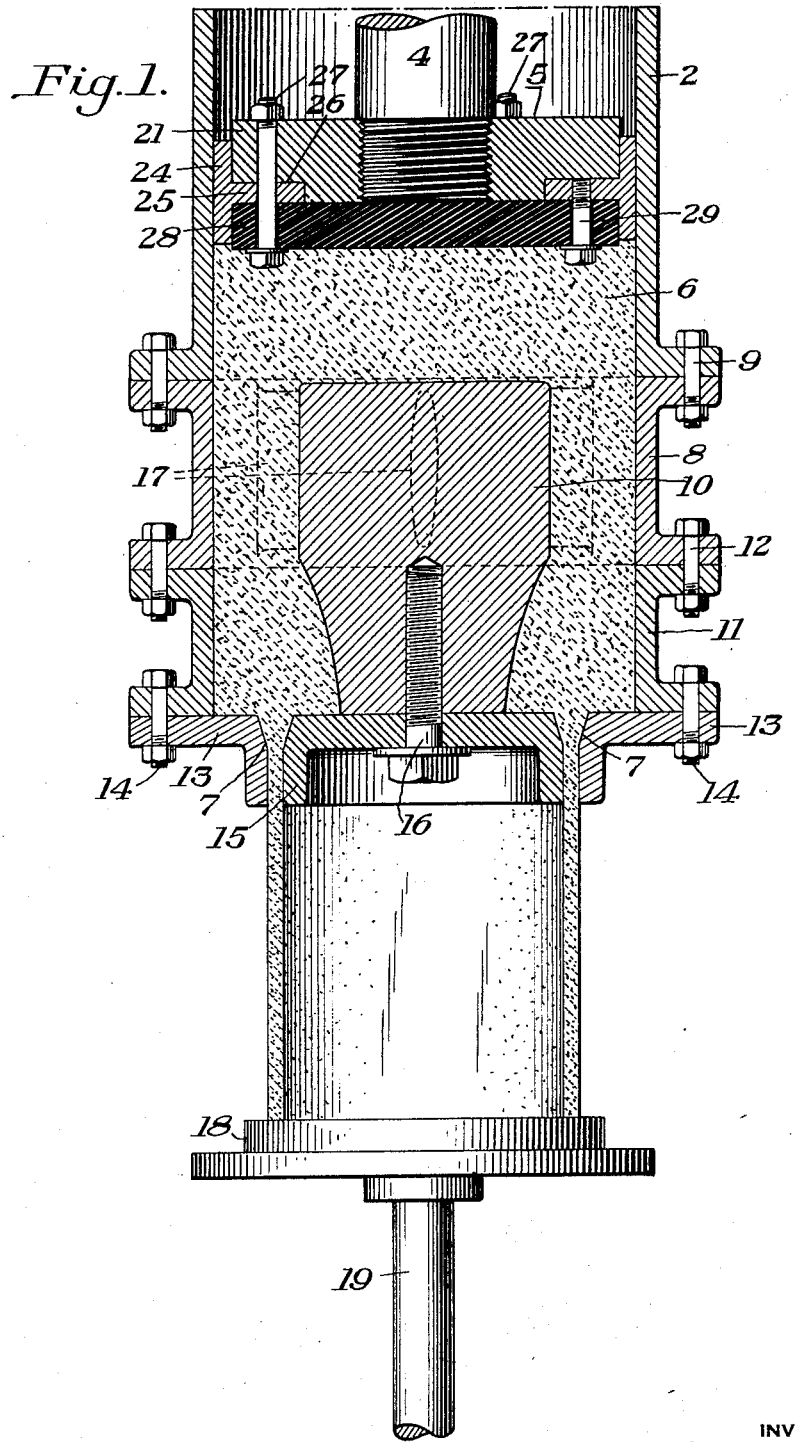

Nov. 14, 1933.  J. J. BURNS  1,935,076
MOLDING MACHINE
Filed July 25, 1929  2 Sheets-Sheet 1

INVENTOR

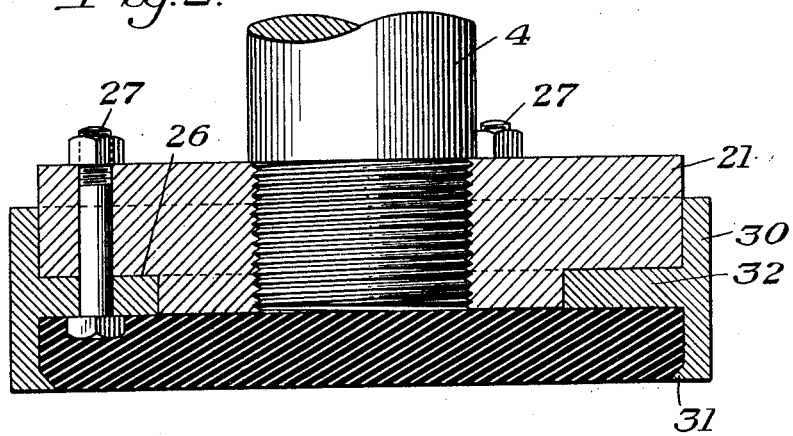
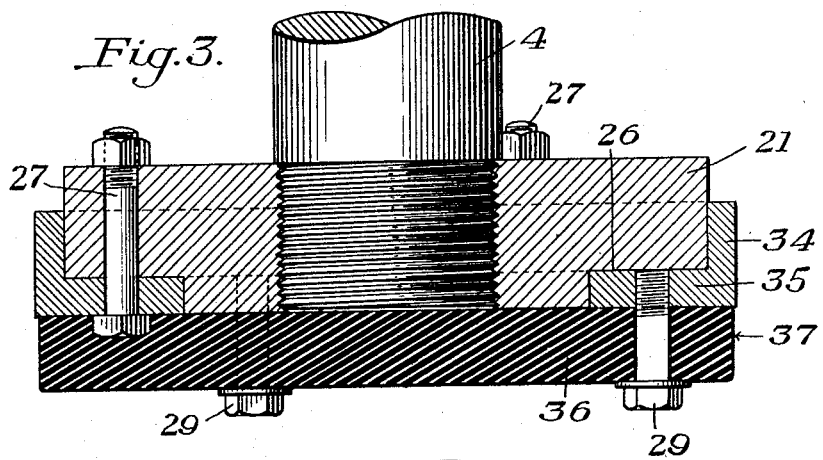
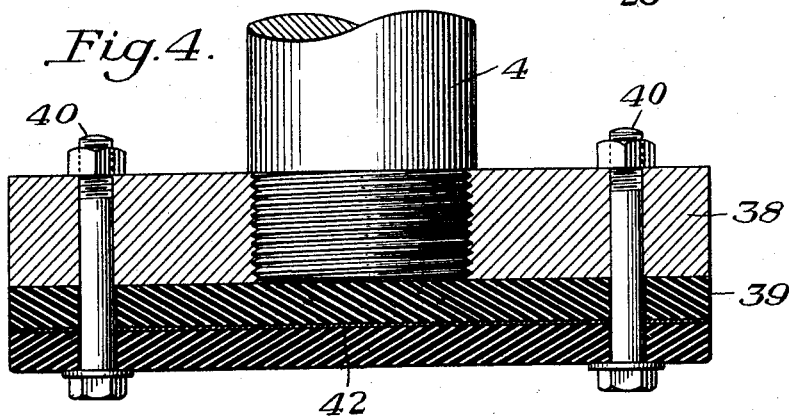

Patented Nov. 14, 1933

1,935,076

UNITED STATES PATENT OFFICE 1,935,076

MOLDING MACHINE

John J. Burns, Toronto, Ohio

Application July 25, 1929. Serial No. 380,855

3 Claims. (Cl. 25—15)

My invention relates to molding machines, and more particularly to pistons or plungers for working earthy materials.

In working earthy materials, such as clay and the like, in molding operations, the earthy material is often forced through a shaping die at the end of a cylinder under considerable pressure applied by a piston or plunger. The pressure compacts the earthy material to a substantially uniform consistency and tends to exclude any air and to close any air pockets which might be in the material.

The characteristics of the adhesion between the surface of a rigid metallic piston and a mass of earthy material are such that upon the withdrawal of the piston at the end of a molding stroke a large part of the adjacent compacted earthy material is torn from the mass of material communicating with the die in the cooperating cylinder. The material adhering to the piston often extends over a large portion of the face of the piston and may weigh several pounds. The suction or condition of partial vacuum existing in the cylinder at the beginning of the return stroke of the piston is of some importance in causing the adhesion.

The above described action is disadvantageous because it causes a jerking or vibrating of the machine at the instant when the back pressure is overcome and the piston and adhering earthy material are separated from the remainder of the earthy material in the cylinder. The back-pull on the mass of material also breaks the continuity of the material and creates pockets. Upon a subsequent application of pressure to the material, the pockets are not entirely closed and the entrapped air is apt to form blisters or bubbles which produce defective articles. Furthermore, the material which has been disturbed by the vacuum, or suction action, when subsequently brought in contact with new material and with the previously compressed material in the cylinder, is apt to form imperfect lines of cleavage, due, in part, to the presence of air pockets.

Attempts have heretofore been made to relieve the condition of back-pressure or suction by utilizing relief valves for admitting air during the withdrawal stroke of the piston. However, such relief valves soon become stopped with earth and become useless.

I provide a molding machine in which the compressing piston is provided with a flexible covering in direct engagement with the earth being compacted and forced through the mold. Upon the withdrawal of the piston the earth does not adhere to the flexible covering to any way near as great an extent as upon the withdrawal of a rigid metallic piston. As a result, the piston is withdrawn from engagement with the material in the cylinder without vibrations such as are caused by the tearing away of a rigid metallic piston from engagement with a body of earthy material. Also, the continuity of the material in the cylinder is not disturbed to such an extent as to form large bubbles or pockets which afterwards produce defective articles.

The accompanying drawings illustrate certain preferred embodiments of the invention, in which Figure 1 is a sectional view of a portion of a molding machine embodying my invention; and Figures 2, 3, and 4 are cross-sectional views of modified forms of pistons.

Referring to Fig. 1, a molding machine for earthy materials comprises a cylinder 2, in which a piston rod 4 and piston 5 threaded thereon reciprocate for forcing earthy material 6 through a die opening 7 disposed below the cylinder 2. A ring section 8 is connected to the bottom of the cylinder 2 by clamping bolts 9. The ring section 8 supports a block 10 which directs the movement of the material 6 as it moves from the cylinder 2 toward the opening 7. A terminal ring 11 is clamped to the ring section 8 by bolts 12 and supports a bottom or terminal plate 13 by bolts 14. The terminal plate 13 defines the outer edges of the die opening 7. As it is well understood in the art, the exact shape of the die opening 7 may vary in accordance with the desired shape of the finished article. For tiles the shape of the opening 7 is frequently circular in cross-section.

The inner surface of the die opening 7 is defined by the outer surface of a disc 15 secured by a bolt 16 to the block 10. As is well understood in the art, the block 10 is secured to the ring 8 by bracing webs 17.

A support 18, carried by a plunger 19 is disposed below the die opening 7 for receiving shaped material 19 extruded through the die opening 7.

The piston 5 comprises a metallic disc 21, which is threaded onto the piston rod 4. A clamping ring 24 is provided with a web 25 entering a seat 26 in the lower surface of the disc 21 to which it is secured by a plurality of bolts 27. The ring 24 insures a tight joint between the inner surface of the cylinder and the outer surface of the disc 21. A body 28 of flexible material is disposed between the lower part of the ring 24 and the web 25 and covers the web 26 and outer surface of the disc 21 for engaging the earthy material 6. The material 28 is secured by the bolts 27 and by secondary clamping bolts 29 extending through the body and into the web 26. I have found rubber having a consistency comparable with that used in a tire tread to be suitable material for the body 28.

When the material 28 is forced into engagement with the earthy material 6, the disc 21 and spacing ring 24 resist the material, while a heavy pressure of the order of 150 pounds per square inch is applied to the earthy material 6 for forcing it through the die opening 7. Upon the withdrawal of the piston, the earthy material 6, even when in the form of clay, is released without excessive vibration to the machine and without injuring the continuity of the material remaining in the cylinder by tearing away large masses as is done where a rigid metallic piston is brought into engagement with the earthy material.

While I am not certain of the exact reason for this phenomenon, it may be caused by one or a number of different reactions. It may be caused by the flexing action of the material 28 when leaving the compacted earthy material by so withdrawing that only small areas of the engaging surfaces of the material and body are separated at any one time, as distinguished from the lifting of substantially the entire top of the material at one time by an inflexible head, such as the metallic pistons heretofore used. Also the characteristics of adhesion between earthy materials, including clay, and metallic pistons may be different than those existing between such earthy materials and flexible materials. Also it may be that when the material 28 is both flexible and resilient, as in the case of rubber, the material is distorted and compacted during the compression stroke, which action closes the joints existing between the different elements of the piston. Upon the release of the compressing force, the resilient material may tend to return to its normal position before an appreciable amount of the return stroke takes place. This small restoring movement of the resilient material may serve, in large part, to break the adhesion between the material 28 and the earthy material 6. The restorative movement of the resilient material may also permit the infiltration of a small amount of air for breaking the vacuum existing at the beginning of the return stroke. Regardless of the explanation for this phenomenon, I have obtained very satisfactory results by the use of a live rubber disc or covering for the end of a piston working against earthy materials.

Fig. 2 shows a form of piston in which the disc 21 cooperates with a ring 30 having an overhanging edge 31. In this form of the invention, a body of flexible material is cast directly between an overhanging edge 31 on the ring 30 and a web 32, corresponding to the web 25 shown in Fig. 1. In this construction the need for secondary securing bolts, such as bolts 29 in Fig. 1, is eliminated.

Referring to Fig. 3, another form of the invention is illustrated in which a ring 34 having a web 35 is disposed in the seat 26. The ring 34 is not provided with a downwardly or forwardly extending flange at the edge of a body 36 of flexible material. In this form of the invention, the outer edge 37 of the material 36 directly faces the inner surface of the cylinder 2, and is bolted to the ring 34.

Fig. 4 illustrates a further modification of the invention in which a disc plate 38, having oppositely disposed similar surfaces, is threaded onto the piston rod 4. A covering or diaphragm 39 of flexible material is disposed over the entire outer face of the plate 38 by clamping bolts 40 for engagement with earthy material. A reinforcing web or layer 42, in the form of a thin metal plate is embedded in the body 39 for strengthening the latter. This form of the invention is particularly useful for very large pistons. The presence of the web 42 controls the movement of the covering to some extent, but permits sufficient flexibility and/or resiliency to accomplish the withdrawal of the piston without jerking of machinery or extensive tearing of the adjacent compacted material.

While I have illustrated and described certain present preferred embodiments of the invention, it is to be understood that it may be otherwise embodied within the spirit of the invention and the scope of the appended claims.

I claim:

1. A molding machine for plastic material comprising a cylinder having a die opening, a piston for extruding plastic material from said cylinder through said die opening, and a relatively stiff disc of rubber-like material secured to said piston for contact with said plastic material.

2. A molding machine for plastic material comprising a cylinder having a die opening, a piston in said cylinder for extruding plastic material from said cylinder through said die opening, a member of resilient material disposed between said piston and said plastic material, and means securing said member in whole to said piston.

3. The combination with a chamber filled with plastic material and a member associated therewith for compressing the plastic material, of means including a member of resilient material attached to the surface of said member in contact with the plastic material for permitting the withdrawal of said compression member without creating a vacuum between said compression member and the plastic material or effecting the surface of the plastic material in contact with the member of rubber in a manner that would create air pockets between the plastic material and a new charge of plastic material under compression.

JOHN J. BURNS.